Sept. 28, 1943.   E. HAMPF   2,330,577
CENTERING DEVICE FOR THE CUTTING OF SHEET-METAL DISKS
Filed Feb. 25, 1942

INVENTOR,
Edvin Hampf
BY
Hascock Downing & Seebold
ATTORNEYS

Patented Sept. 28, 1943

2,330,577

UNITED STATES PATENT OFFICE 2,330,577

CENTERING DEVICE FOR THE CUTTING OF SHEET-METAL DISKS

Edvin Hampf, Goteborg, Sweden, assignor to Fabriksaktiebolaget Haldataxametern, Halmstad, Sweden, a company of Sweden Application February 25, 1942, Serial No. 432,366
In Sweden January 13, 1941

3 Claims. (Cl. 164—71)

The present invention refers to a centering device for the cutting of sheet-metal disks, particularly in such plate cutting machines wherein the cutting members are arranged stationary, while a rotary movement is imparted to the plate during the cutting operation about the center of a pointed pivot. Means of this type as hitherto known suffer from the disadvantage that the recess produced by the pivot in the plate will be worn out or extended when the plate is being moved around, so that a play will set in which may result in that the cut disk will not be of an exactly circular shape. The object of the present invention is to prevent the production of such play, and to ensure steady retaining of the piece of sheet-metal in a centered position during the cutting operation. To this end, the centering pivot and the bed or matrix pertaining thereto are arranged, according to the invention, on pins adapted to be turned about the central axis, said pins being mounted in corresponding parts of the machine frame in a manner such that an axial movement may be imparted to the pins to bring them toward one another when they are turned in the same direction. By reason of the friction between the pivot and the bedding on the one hand and the piece of sheet-metal on the other hand, said pins thus tend to clamp the piece of sheet-metal between the pivot and the bedding in the process of cutting, whereby a play will be effectively prevented.

Figure 1:
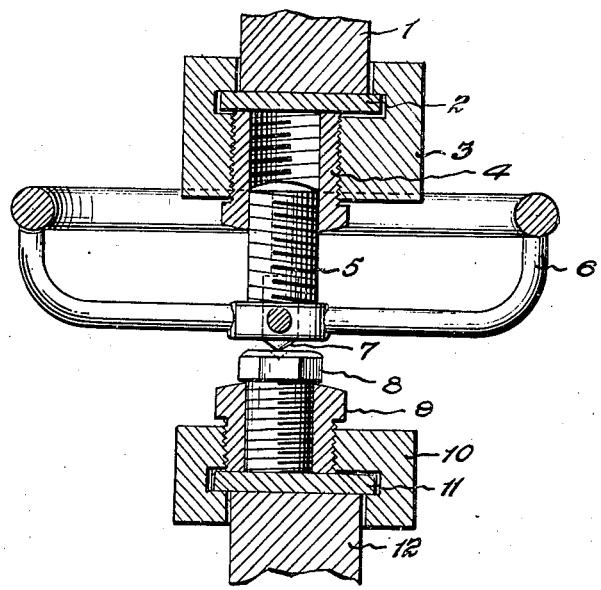
Figure 2:
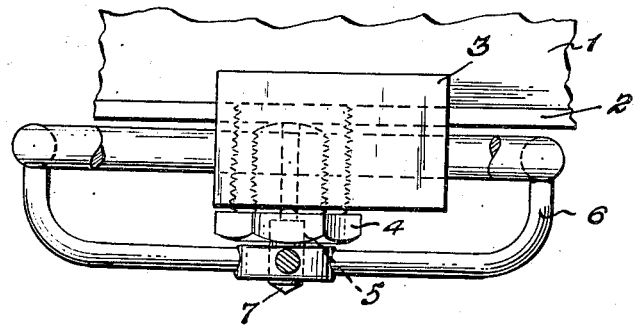
Figure 2:
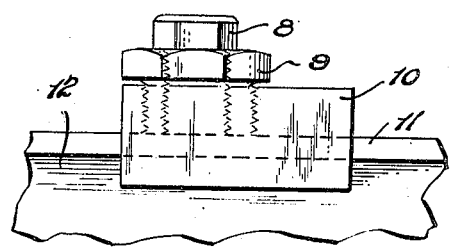

The invention is illustrated in the accompanying drawing, wherein Figure 1 shows a cross section of the centering device according to one form of embodiment of the invention and Figure 2 represents a view in elevation thereof in another position of adjustment.

In the drawing, 1 and 12 designate the upper one and the lower one respectively of the two frame arms between which the sheet-metal is being advanced during the cutting operation, said arms carrying at their outer ends the cutting members not shown in the drawing. On the sides of said arms facing one another are secured guide rails 2 and 11 respectively extending radially in the longitudinal direction of the arms in a mutually parallel relationship. The centering device is adjustable to different radial distances along said guide rails through the agency of two runners 3 and 10 which may be locked to the respective rails by means of fastening screws 4 and 9 respectively, the upper one of which is left-handed and the lower one right-handed. Said fastening screws are coaxially arranged and provided with central, internally threaded bores adapted to receive the pins 5 and 8 to be screwed into the same. The upper pin 5 is right-handed and the lower pin 8 left-handed. The centering pivot 7 is coaxially arranged in the pin 5 and rigidly secured to the latter. The pin 5 is also provided with a hand wheel 6. The upper end of the pin 8 is intended to serve as a bedding or matrix for the centering pin 7, and to this end it is as usual provided with a central conical countersink.

The sheet-metal to be cut is placed on the lower left-handed screw 8, whereupon the right-handed screw 5 is screwed down by means of the hand wheel 6, so that the pointed end of the pivot 7 is pressed against the sheet metal. When in the process of cutting the piece of sheet-metal is moved round, in a clockwise direction as viewed from above, the oppositely threaded pins 5 and 8 will, to commence with, be entrained through friction by the sheet-metal at the rotary movement thereof, the sheet-metal being thus clamped still further between the pivot and the pin 8 in a manner to effectively prevent the production of play between the sheet-metal on the one hand and the pivot 7 and the pin 8 on the other hand. Through the friction between the pins 5 and 8 on the one hand and the screws 4 and 9 on the other hand, the pins 5 and 8 at their movement will transfer a turning moment onto the fastening screws 4, 9. Since the latter screws are threaded in opposite directions, the locking effect of the screws against the guide rails 2, 11 will thus be ensured. The cutting operation having been completed the sheet-metal is loosened by the pin 5 being turned back by means of the hand wheel 6. Figure 2 shows the device at a fully turned-back position of the pin 5.

Obviously, the arrangement described may also be used in plate shearing machines wherein the cutting members rotate about the centering axis while the sheet-metal is kept stationary during the cutting operation.

I claim:

1. A centering device for cutting of disks in plate cutting machines comprising a centering pivot, a matrix for cooperating therewith, coaxial pins carrying said centering pivot and matrix respectively and threaded in opposite directions, fastening screws coaxial with said pins and into which said pins are threaded, said fastening screws being also threaded in opposite directions into corresponding parts of the machine frame, the threads of the pins and screws being so arranged that a unidirectional turning moment transmitted from the plate to said pins and screws during the cutting operation will tend to cause an axial displacement of the pins towards each other and of the fastening screws away from each other so as to also clamp the corresponding parts of the machine frame.

2. A centering device for cutting of disks in plate cutting machines comprising a centering pivot, a matrix for cooperating therewith, coaxial pins carrying said centering pivot and matrix respectively and threaded in opposite directions into fastening screws coaxial with said pins and threaded in opposite directions into runners adjustable along guide rails on the machine frame and adapted to be secured to the rails by means of said fastening screws, the threads of the pins and screws being so arranged that a unidirectional turning moment transmitted from the plate to said pins and screws during the cutting operation will tend to cause an axial displacement of the pins towards each other and of the fastening screws away from each other.

3. A centering device for cutting of disks in plate cutting machines comprising a centering pivot, a matrix for cooperating therewith, coaxial pins carrying said centering pivot and matrix respectively, parallelly extending guide rails on the machine frame, and runners adjustable along said guide rails and carrying said pins the pins being threaded in opposite directions into the runner so that the turning moment imparted to the pins during the cutting operation will tend to cause an axial displacement of the pins towards each other and a locking of the runners to the guide rails.

EDVIN HAMPF.